Sept. 30, 1969   R. W. JONES   3,470,374
INFRARED DETECTION SYSTEM USING DIGITAL CONTROLS
Filed March 6, 1967   2 Sheets-Sheet 1

*INVENTOR.*
ROGER W. JONES
BY *Robert G. Rogers*
ATTORNEY

United States Patent Office 3,470,374
Patented Sept. 30, 1969

3,470,374
INFRARED DETECTION SYSTEM USING DIGITAL CONTROLS
Roger W. Jones, Garden Grove, Calif., assignor to North American Rockwell Corporation, a corporation of Delaware
Filed Mar. 6, 1967, Ser. No. 621,046
Int. Cl. G01j 1/18, 1/32
U.S. Cl. 250—83.3         6 Claims

ABSTRACT OF THE DISCLOSURE

An infrared detection system using a laser having a relatively broad dynamic range for generating a reference radiation level for comparison with a radiation level generated by a target such as a circuit board, by means of a chopper and a detector, including a circuit for obtaining the difference between the two levels and for converting the difference into a digital signal for controlling the output of the laser and for indicating the temperature of the target. The output of the laser is regulated so that when a null is obtained between the reference radiation and target radiation, the readout on a register controlling the reference radiation source indicates the temperature of the target.

BACKGROUND OF THE INVENTION

Field of the invention

The invention relates to an infrared radiation detection system using digital controls and, more particularly, to such a system wherein reference radiation levels are subtracted from test radiation levels and the difference is converted into digital control signals for indicating the temperature of the target generating the test radiation level and for regulating the level of the reference radiation.

Description of prior art

Conventional infrared radiometers use a calibrated linear output amplifier to process the output of an infrared detector. The output of the radiometer is a D.C. voltage analog of the difference between the incoming radiation and the radiation reflected by, for example, the reverse side of a chopper.

The dynamic range of conventional radiometers is limited by the linear amplification range of the amplifier. In other words, since the reference level is ordinarily fixed and since the incoming radiation level varies over a broad range, the difference which must be amplified often exceeds the linear range of the amplifier. As a result, the output becomes non-linear. Since the difference can be substantial, ambient temperatures have a greater effect on the value and therefore corrections must be made.

Patent No. 3,131,308 to W. R. Frederickson et al., for a self-calibrating radiometer with both the reference source and test source interrupted by one chopper and reference source interrupted by a second chopper, teaches two sources of radiation directed into a detector through two choppers. However, no means are taught as shown for converting the difference signal into a digital signal for controlling a reference source over a broad range and for indicating the temperature of a target.

Patent No. 2,817,769 to E. Horace Sigler, Jr., et al., for Radiation Comparison System, teaches interrupting or modulating two beams of radiation at two different frequencies which are related so that the radiation intensity of one beam with respect to the other can be readily detected. The unwanted, spurious radiations are thereby rejected and suppressed. However, no means are taught or shown for converting the difference signal into a digital signal for controlling a reference source over a broad range and for indicating the temperature of a target.

A system is needed in which the temperature of a target source is obtained by nulling, or balancing, a reference radiation level against an incoming target radiation level so that the amplifiers and other component parts of the system can be linearly operated within their dynamic range. A desirable system should also include some means for varying the pulse width and/or amplitude of the reference source over a range comparable to the range of radiation from the target. In order to eliminate noise problems, and to provide more definite controls, the error signal should be converted into a digital signal which is less susceptible to interference from noise.

SUMMARY OF THE INVENTION

Briefly, the invention comprises a system for obtaining the difference between reference radiation generated by, for example, a laser source having a broad dynamic range and radiation emitted from a target source such as a circuit board. The system includes means for converting the difference into a digital signal for controlling the magnitude and width of the reference radiation over the range of the target radiation source.

The target and reference radiation levels may be combined by means of a chopper, preferably in the form of a circular disc having a plurality of alternate opaque and transparent segments. The opaque segments comprise mirrored surfaces on the side adjacent to a detector means, so that the reference radiation is deflected into a detection means. The reference radiation and target radiation are sequentially recorded by the detector.

In one embodiment, means are included for combining the reference and target pulses from the detector. The resulting signal is converted into a digital signal having either a negative or positive magnitude for adding or subtracting one to a number indicated in a register. The register is connected to means for controlling the output of the laser. By adding a binary one to the register contents, the output of the laser is either increased or decreased.

The number contained in the register indicates the temperature of the radiation source. In other words, each time a binary one is required to be added to the register for increasing the output of the laser, a corresponding increase in temperature of the target is indicated by the register. When the reference and target radiation are approximately equal, the number in the register indicates the temperature of the reference and the target.

Therefore, it is an object of this invention to provide an improved infrared radiation encoder system using a digital control signal for reducing noise interference.

Another object of this invention is to provide an infrared radiation encoder system which is relatively unaffected by ambient temperatures.

Still a further object of this invention is to provide an infrared radiation encoder system in which the broad dynamic range of the laser providing a reference radiation source can be utilized.

Still a further object of this invention is to provide an improved infrared radiation encoder system in which the temperature of the target source is controlled as indicated by digital signals.

Still another object of this invention is to provide an improved radiation encoder system using a laser reference radiation source for comparison with a laser radiation from a target source by means of a chopper and digital control circuits.

These and other objects of the invention will become more apparent in connection with the following drawings.

DESCRIPTION OF PREFERRED EMBODIMENTS

Figure 1:
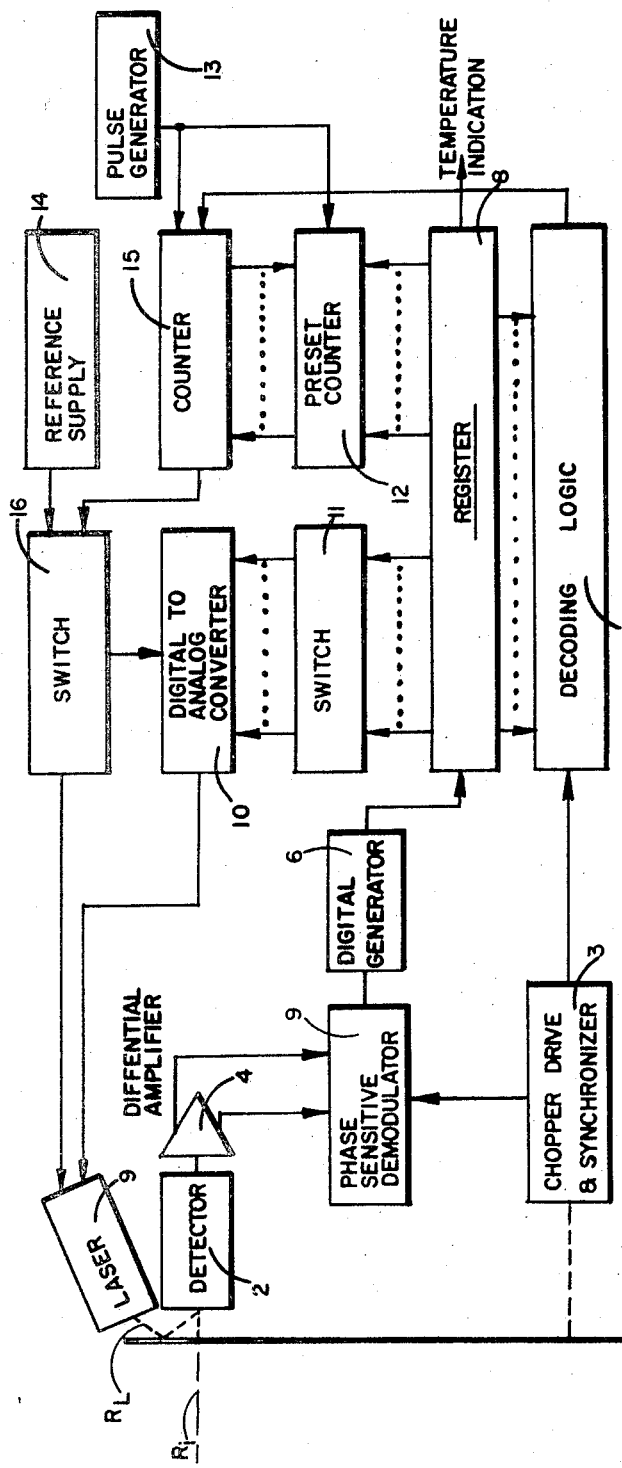
FIGURE 1 illustrates one embodiment of an infrared radiation encoder system for indicating the temperature of a target source by comparing radiation emitted from a reference source and the target source.
Figure 3:
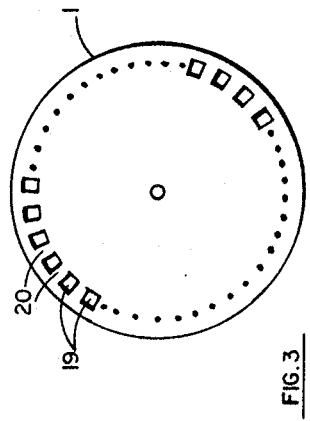
FIGURE 3 illustrates one embodiment of a chopper blade showing alternate transparent and reflective surfaces.

FIGURE 1 shows an infrared radiation encoder system comprising chopper blade 1 connected by a shaft to chopper means 3. The chopper blade comprises alternately spaced transparent segments 19 and on one side, mirrored segments 20 as shown in FIGURE 3. Disposed behind the chopper blade and in line with the transparent and mirrored segments for receiving radiation passed either through the transparent or reflected from the mirrored surfaces, is detector means 2. Radiation received through the transparent segments is identified by the letter T in FIGURE 4 and the radiation reflected from the mirrored segments is identified as M in FIGURE 4.

Signals from the detector are amplified in differential amplifier 4 and divided into two signals. One of the signals undergoes a 180° phase reversal. In other words, one signal may appear as the signal in part A of FIGURE 4 and the other signal may apear as the signal in part B of FIGURE 4. In the first signal, $R_L$ provides the reference level and in the second signal $R_i$ provides the reference level. The signals illustrated in parts A and B actually represent specific conditions, i.e. when $R_i > R_L$ and when $R_i < R_L$, although the signals do illustrate the phase reversal described. The amplifier is connected to phase sensitive demodulator means 5 wherein the signals are combined in the form shown in part C of FIGURE 4. The demodulator is connected to digital signal generator means 6 which is connected to register means 8.

The register is connected to decoding logic 7 wherein the count in the register is decoded and converted into a pulse. Decoding logic 7 is connected between chopper drive-synchronizer 3 and counter 15. The decoding logic receives a synchronizing pulse from the chopper drive and provides an output pulse to trigger counter 15.

First switching means 11 such as diode gating network is connected between the least significant bit positions of the register and reference radiation source 9 shown as laser 9 in FIGURE 1.

Pre-set counter 12 is connected between the most significant bit positions of the register and counter 15. The count in the register sets the count in the pre-set counter at the beginning of each cycle. The pre-set counter counts down when it receives a pulse from counter 15 and resets counter 15 to all zeros when it counts down to zero at the end of each cycle.

Digital to analog converter 10 is connected between first switch means 11 and laser means 9. The particular combination of resistors comprising the network is set by switch means 11 which is controlled by the count in the least significant bit positions of register 8.

The digital to analog converter is also connected to second switching means 16 which may be mechanized by diode gates. The second switch means is connected between laser 9 and reference power supply means 14. The switch means is turned on and off in response to signals from counter 15.

Counter 15 is connected between pre-set counter 12, pulse generator 13 and second switch means 16. When actuated, counter 15 counts pulses generated by pulse generator 13. The pulse generator also provides a gating signal to pre-set counter 12.

Optic means (not shown) may be provided for focusing the incoming radiation into the transparent areas of the chopper blade.

FIGURE 3 shows the side of the chopper blade adjacent to the detector as comprising transparent openings 19 separated by mirrored surfaces 20. Although the particular embodiment shows an equal spacing and equal area for each of the openings and reflective surfaces, in other embodiments the spacing and the area occupied by either or both could be changed. Incoming radiation from the target is interrupted by the opaque areas between the transparent openings. During the period that the target radiation is interrupted, or cut off on the detector, laser radiation is reflected into the detector. As a result, the levels of radiation generated by the laser and by the target are "chopped" into pulses having a maximum width equal to the width of the reflective segments and transparent openings. The shaft is connected to the center of the chopper blade which is rotated by a suitable power source such as an electric motor comprising a part of chopper drive means 3.

Detector 2 may comprise a conventional infrared radiation detector such as a thermal or photo detector. A thermal detector depends on temperature changes produced by the incoming radiation to change the electrical or physical properties of the detector. The photo detectors respond to the incoming radiation by generating electron-hole pairs in semi-conductor materials. Both detectors are commercially available.

Figure 4:
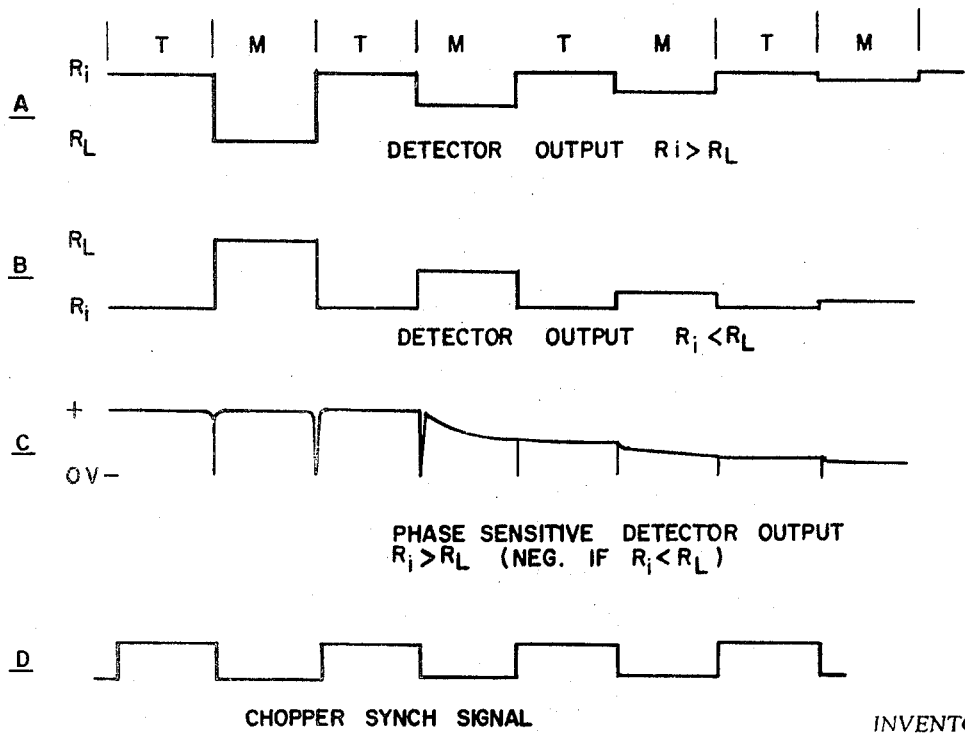
FIGURE 4 illustrates one set of waveforms generated during the operation of the system.

Both the incoming radiation signal and the laser radiation reference signal have relative positive going magnitudes, inasmuch as the signals' increase indicates positive as contrasted with negative temperature. Therefore, in order to subtract the two signals, one signal must be inverted. Demodulator means 5 which may also be designated as a detector, in effect subtracts the areas of the inverted signals so that a difference signal is provided at the output as shown in part C of FIGURE 4. The demodulator is controlled by a signal from chopper 3 which has a frequency related to the spacing of the transparent and mirrored segments of the chopper blade. The chopper signal is illustrated in part D of FIGURE 4. In other words, during the positive going portion of the chopper, the difference between the radiation signal passing through the transparent portion of the chopper blade and the previous signal reflected from the mirrored portion of the chopper blade is determined. During the negative going half cycle of the chopper signal, the difference between the signal reflected from the mirrored portion of the chopper blade and the signals previously passing through the transparent portion is determined. As shown in FIGURE 4C, as the signal reflected from the mirror increases and becomes approximately equivalent to the signal passing through the transparent portion of the chopper blade, the output from the phase sensitive demodulator decreases.

As a result, the output from the modulator is the difference between the two signals in the form of either negative or positive going pulses depending on which of the signals has the greater area. In most cases, the signal will be positive going because the incoming radiation ordinarily is greater than the reference radiation. Phase sensitive demodulators (or detectors) are believed well known in the art. For that reason additional details are not included.

Although a phase sensitive demodulator is illustrated for determining the difference between the incoming target radiation and the reference radiation, it should be obvious that other means such as an integrator and similar circuits could also be used for obtaining a difference signal.

Digital generator means 6 may be mechanized by a conventional flip flop or by an amplifier properly biased for amplifying and converting the incoming analog difference signal into a digital signal having a fixed width and magnitude. If the incoming difference signal is negative, the generator provides a negative output signal to register 8. If the incoming signal is positive, the generator provides a positive digital output signal to add register 8.

Register means 8 may comprise a state of the art counter for incrementing or decrementing the count in the register. Another register may be comprised of a series of approximation type register. For the embodiment shown, it is assumed that the register comprises an up or down binary counter which counts one for each positive pulse received and subtracts one for each negative pulse received. The exact length of the register is to a certain extent dependent on the dynamic range of laser 9. In other words, the register should be able to count to a maximum magnitude equivalent to the maximum output of the laser and should be able to count in increments sufficient to obtain a relatively precise indication of the target radiation temperature.

For the particular embodiment shown, the least significant bit portions of the register are connected to switch means 11. The least significant count provides digital control signals which are converted by the digital to analog converter means 10 into analog signals for controlling the magnitude of a recurring first pulse of the radiation from laser 9. In other words, during the initial counting cycle of the register, the laser output pulse has a fixed width but increases in magnitude by one increment each time an add pulse is received in the register. The initial pulse output of the laser is therefore increased in increments of magnitude until the counter exceeds the least significant bit positions. Subsequently, the output pulse is controlled by the counter in the most significant bit positions and the least significant bit positions of the register.

Figure 2:
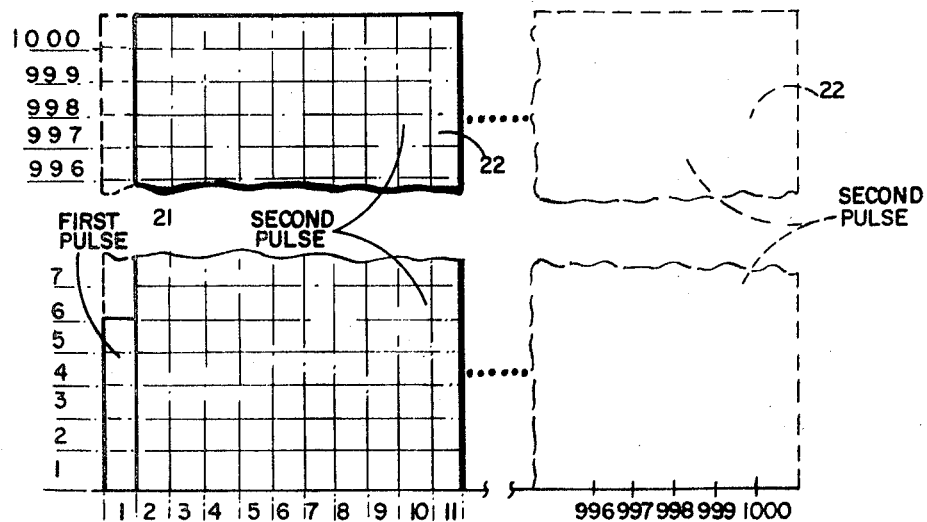
FIGURE 2 illustrates one embodiment of a pulse width and magnitude range for a laser having a broad dynamic range.

The most significant bit positions of the register are connected to pre-set counter means 12 for controlling the pulse width of a second pulse of the radiation generated by laser 9 after the initial pulse is generated as shown in FIGURE 2. Each time an "add" binary pulse is received in the most significant bit positions of the register, the width of the laser radiation pulse is increased. The least significant portions receive pulses and a new first pulse is generated increment by increment until the most significant half of the register increases by an additional binary one, at which time a pulse having a fixed amplitude and increased width is generated.

An indication of the change in laser output signal is controlled by the digital signals as shown in FIGURE 2. During the initial count, the signal increases in increments for forming pulse 21 having a minimum magnitude equivalent to the lowest increment (1) shown in pulse 21 and having a maximum magnitude equivalent to the uppermost increment (1000). The width of the pulse remains constant. As soon as the pulse maximum magnitude has been reached, second pulse 22 of constant maximum amplitude is generated.

The width of the second pulse increases as the count in the most significant bit positions of register 8 increases to a maximum width of 1000 spacing. In other words, during the first count in the most significant bit positions, the pulse has a width equivalent to one spacing. During a second count, the pulse has a width equivalent to two spacings. For the specific example shown in FIGURE 2, the count in the first signal bit positions is 00 . . . 00110 (decimal 6) and the count in the most significant bit positions is 00 . . . 001011 (decimal 11). The process continues until the least significant bit positions of the register are filled. Subsequently, the pulse changes by increasing the width from column to column until the maximum pulse width is generated by laser 9.

The laser may be a state of the art diode laser which has a relatively broad dynamic range as shown by FIGURE 2. In other words, inasmuch as the laser can generate an output pulse which is variable over a range of 1000 times 1000, the laser has a broad dynamic range which is equivalent to the range of an infrared detector.

The differential amplifier need not have a linear output over a broad range since it merely determines the polarity of the detector integrated output. In prior art systems the amplitude was required to amplify a relatively large signal outside its range. The output of the system is therefore not limited by the linear dynamic range of the amplifier.

If the sensitivity of the detector is such that cooling is required, the same cooling system could also be used to improve the output characteristics of the diode laser so that both would be subjected to the same environmental conditions.

In operation, the radiation from the laser may initially be zero so that the radiation from the target is detected and used to provide an initial difference signal. A binary signal of one is added to the register so that the laser is caused to generate an output signal. The initial count of one is decoded by logic 7 and used to turn counter 15 on. The counter counts pulses from generator 13.

The most significant bit positions are initially zero so that the pre-set counter is set to zero. The initial count in counter 15 connects the power supply through switch 16 to the digital analog converter. The digital analog converter is set by the initial count in the register so that the voltage of the power supply is divided across the resistors comprising the digital to analog converter network and is used to generate an output for laser 9. The initial output may comprise a first pulse having an increment of one, as shown in FIGURE 2. The counter 15 remains on until counter 12 counts to zero. Since the most significant bit positions, as previously indicated, are zero during the initial cycle, only one pulse from generator 15 would be counted during the initial cycle.

Each time a digital pulse is received by the register, the cycle is repeated and the first pulse is incremented until the maximum magnitude of the pulse shown as 1000 has been reached. The counter is designed so that when the first pulse has reached a magnitude, a pulse is generated into the most significant bit positions of the register.

When the most significant bit position receives a first pulse, it is de-coded and counter 15 begins to count pulses from generator 13. During the second count from counter 15, switch means 16 connects the reference supply directly to laser means 9 for generating a pulse substantially as shown in FIGURE 2 as the second pulse having a width of one spacing on the horizontal scale. Subsequently, as the least significant bit positions of the register are increased by one for each digital signal received, a first pulse is generated and increases increment by increment until it reaches its maximum magnitude at which time a second pulse is generated equal to the maximum amplitude of the first pulse and having a width of two spacings on the horizontal scale. The first pulse amplitude is reduced to zero. Further incremental increases in the count in register 8 cause the amplitude of pulse 21 to increase until a maximum is again reached. The width of the second pulse is incremented and the first amplitude is returned to zero. Subsequently, the process repeats itself until the radiation from two sources are approximately equal, at which time a zero signal occurs from the generator. As a result, the temperature of the target and reference radiation source is then indicated as the count on the register. It may be necessary to convert the binary count into an equivalent temperature reading, however.

At the relatively low differences, it may be possible for a noise to generate an add or subtract pulse. However, in that case, although one pulse might be generated, it would cause an imbalance to occur so that an opposite pulse would be immediately generated to correct the change. Therefore, even though noise may occasionally cause a plus or minus digital signal to be generated, a substantial signal would immediately correct for the noise pulse.

Although the invention has been described and illustrated in detail, it is to be understood that the same is by way of illustration and example only, and is not to be taken by way of limitation; the spirit and scope of this invention being limited only by the terms of the appended claims.

I claim:
1. An infrared radiation encoder system comprising,
a first source of reference radiation,
a second source of radiation, means for generating signals indicating the value of the radiation from each of said sources, including means for converting the difference between said signals to digital control signals for controlling the output of said reference radiation source, said means for generating signals comprises detector means, and chopper means having a circular configuration including adjacent transparent and reflective segments along the outer circumference of said chopper for passing radiation from said second source through the transparent segments into said detector means, and for reflecting radiation from the reflective segments generated by said first source into said detector means, said detector includes means for generating said signals indicating the value of the radiation generated by said first source and the value of the radiation generated by said second source, and wherein said means for converting includes means for obtaining the difference in area between said signals, and means for generating an output signal equivalent to said difference.

2. An infrared radiation encoder system comprising,
a first source of reference radiation,
a second source of radiation,
means for generating signals having areas representing the radiation from each of said sources, said means for generating signals comprising detector means, and chopper means having a circular configuration including adjacent transparent and reflective segments along the outer circumference of said chopper for passing radiation from said second source through the transparent segments into said detector means, and for reflecting radiation from the reflective segments generated by said first source into said detector means,
said means for generating further including means for converting the difference in the areas of said signals to a digital output signal equivalent to said difference for changing the radiation from said reference source until said signal areas are the same.

3. The combination as recited in claim 2, wherein said digital signal has a polarity for changing the polarity of the output radiation from said reference source until the said signal areas representing the radiation are approximately equal.

4. The combination as recited in claim 2, wherein said reference source comprises a laser means and a counter having a range for controlling the output of said laser from zero to its maximum radiation output whereby the laser radiation can be independently increased and decreased over the same range as the radiation from said second source.

5. The combination as recited in claim 2 including synchronous demodulator means for driving said chopper and means for providing a control signal to said synchronous demodulator means for inverting the polarity of the signal area representing the reference radiation, and said means for converting further comprising,
means for integrating the signal areas over a cycle of said generated signals for generating said digital output signal having a polarity equal to the difference between the areas,
register means,
means responsive to said difference for generating said digital output signal having a polarity for changing the count in said register means, means responsive to the counter in said register means for changing the pulse width and/or magnitude of the reference radiation until the radiation from said second source and the reference radiation are equal.

6. The combination recited in claim 5 including means responsive to said register means for indicating the temperature of said reference radiation as a function of said count.

References Cited

UNITED STATES PATENTS

| | | |
|---|---|---|
| 3,130,308 | 4/1964 | Astheimer. |
| 3,287,556 | 11/1966 | Good. |
| 3,372,278 | 3/1968 | Aemmer. |

ARCHIE R. BORCHELT, Primary Examiner

U.S. Cl. X.R.

73—355